(No Model.)
J. F. COIGNET.
FURNACE.
No. 315,478. Patented Apr. 14, 1885.
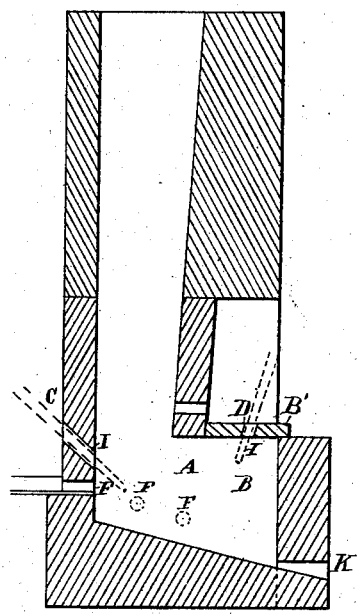
Fig. 1.
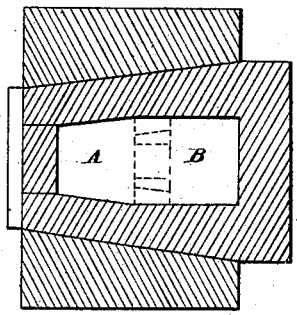
Fig. 1ᵃ.
Fig. 1ᵇ.
WITNESSES:
W. T. Robertson
J. C. Lathrop
INVENTOR
Jean François Coignet
BY
J. L. Stetson
ATTORNEY

UNITED STATES PATENT OFFICE.

JEAN FRANCOIS COIGNET, OF LYONS, FRANCE.

FURNACE.

SPECIFICATION forming part of Letters Patent No. 315,478, dated April 14, 1885.

Application filed August 28, 1884. (No model.)

*To all whom it may concern:*

Be it known that I, JEAN FRANCOIS COIGNET, of Lyons, in the Department of the Rhone, France, have invented certain new and useful Improvements in Furnaces for the Treatment of Copper Ores, of which the following is a specification.

I introduce air under sufficient pressure through a tube or tuyere terminating below the surface of the melted material. The air escapes through one or more orifices at its extremity, and rising through the melted mass unites with or burns out the sulphur and the iron, making the first into sulphurous acid and the second into oxide of iron, which becomes a slag and floats on the surface of the denser fluid. The slag and the matte, rich in copper, are drawn out through suitable orifices. I use the term "matte" in the sense in which it is often employed both in English and French to indicate a fusible compound of copper with sulphur and iron, which ordinarily requires to be reduced by repeated treatments. The iron oxidizes more readily than the copper, and the oxide formed is lighter. It requires more effort to burn out the sulphur.

The accompanying drawings form a part of this specification and represent what I consider the best means of carrying out the invention.

Figure 1 is a central vertical section showing a form of apparatus adapted to realize successfully the benefits of the invention. Fig. 1ª is a horizontal section of the same on the line *x x* in Fig. 1. Fig. 1ᵇ is an enlarged detail of one of the tuyeres.

Similar letters of reference indicate corresponding parts in all the figures where they occur.

Referring to Figs. 1 and 1ª, A represents the principal or back portion of the interior of the furnace, and B an addition, by the aid of which the apparatus can be operated continuously.

C is an opening through which is introduced, by means of a tuyere, I, a blast of air which is allowed to escape through one or more orifices in the end of the tuyere at a moderate depth in the melted material. Under the action of the blast thus introduced the sulphur is rapidly burned out, and the iron is oxidized and transformed into a slag, which latter mixes with the other foreign matter and floats on the surface of the denser matte. When the slag attains a certain height above the lunette, I withdraw the tuyere and gradually diminish the force of the blast. The material is allowed to remain at rest for a few minutes, during which time any of the denser metal which may have been thrown up by the agitation into the slag has time to find its way down through the latter and unite with the dense metal. Then the slag is drawn out through the openings F F, which I term the "lunette." When a good portion of the slag is withdrawn, the tuyere is again thrust down into the melted mass and the air is again injected and allowed to rise through the fluid. It will be understood that there may in practice be a number of the tuyeres on different sides of the furnace, and also a number of the orifices through which the slag may be withdrawn.

When the operation is to be so conducted that the slag shall be withdrawn continuously, the hearth is extended laterally, as indicated by B, and the extension-cover B' is pierced by an orifice, D, into which is introduced another tuyere with connections for supplying air at a sufficient pressure. The reactions described above occur and the distance which the slag has to flow to reach the orifice is considerable. During this passage any particles of the heavier metal which may have become mingled with the slag have time to trickle down. Thus, in this form of the furnace, the operation of blowing and of discharging the slag may be made continuous. There may be more than one of the extensions B of the hearth.

I claim as my invention—

The furnace A, having extension B, with perforated roof-plate B', and having also slag-exits F, metal-exit K, and apertures C, the tuyeres I, having multiple air-exits and adapted to be projected into the charge, all combined and operating as and for the purposes set forth.

In testimony whereof I have signed this specification in the presence of two subscribing witnesses.

JEAN FRANCOIS COIGNET.

Witnesses:
LOUIS BACHELU,
I. P. A. MARTIN.